United States Patent
Wilson et al.

(10) Patent No.: US 10,371,124 B2
(45) Date of Patent: Aug. 6, 2019

(54) SYSTEM AND METHOD FOR DETERMINING WIND FARM WAKE LOSS

(71) Applicant: General Electric Company, Schenectady, NY (US)

(72) Inventors: Megan Wilson, Greenville, SC (US); Stefan Kern, Munich (DE); Akshay Krishnamurty Ambekar, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 180 days.

(21) Appl. No.: 15/156,446

(22) Filed: May 17, 2016

(65) Prior Publication Data
US 2017/0335827 A1    Nov. 23, 2017

(51) Int. Cl.
*F03D 7/04*    (2006.01)
*F03D 17/00*    (2016.01)

(52) U.S. Cl.
CPC ............. *F03D 17/00* (2016.05); *F03D 7/048* (2013.01); *F05B 2260/821* (2013.01)

(58) Field of Classification Search
None
See application file for complete search history.

(56) References Cited

U.S. PATENT DOCUMENTS

| | | | |
|---|---|---|---|
| 7,941,304 B2 | 5/2011 | Gundling | |
| 8,050,899 B2 | 11/2011 | Gignuere et al. | |
| 8,295,987 B2 | 10/2012 | Gadre et al. | |
| 2009/0192868 A1 | 7/2009 | Rajiv et al. | |
| 2010/0274400 A1 | 10/2010 | Ormel et al. | |
| 2010/0274401 A1 | 10/2010 | Kjaer et al. | |
| 2012/0053983 A1 | 3/2012 | Vittal et al. | |
| 2013/0166082 A1 | 6/2013 | Ambekar et al. | |
| 2013/0184838 A1 | 7/2013 | Tchoryk, Jr. et al. | |

(Continued)

FOREIGN PATENT DOCUMENTS

WO    WO2013152776 A1    10/2013

OTHER PUBLICATIONS

Tanvir Ahmad(1), Nicolas Girard(2), Behzad Kazemtabrizi(1), Peter C. Matthews(1), Analysis of Two Onshore Wind Farms With a Dynamic Farm Controller, Nov. 6, 2015.*

(Continued)

*Primary Examiner* — Matthew G Marini
(74) *Attorney, Agent, or Firm* — Dority & Manning, P.A.

(57) ABSTRACT

The present disclosure is directed to a system and method for determining wake losses of a wind farm. The wind farm includes a plurality of wind turbines. The method includes operating the wind farm in a first operational mode. Another step includes collecting turbine-level data from at least one upstream wind turbines in the wind farm during the first operational mode. The method also includes estimating a freestream farm-level power output for the wind farm during first operational mode based, at least in part, on the collected turbine-level data. A further step includes measuring an actual farm-level power output for the wind farm for the first operational mode. Thus, the method also includes determining the wake losses of the wind farm for the first operational mode as a function of the measured actual farm-level power output and the estimated freestream farm-level power output.

15 Claims, 5 Drawing Sheets

(56) References Cited

U.S. PATENT DOCUMENTS

| | | | |
|---|---|---|---|
| 2015/0211486 A1* | 7/2015 | de Boer | F03D 7/0224 290/44 |
| 2015/0345476 A1 | 12/2015 | Gregg et al. | |
| 2016/0084233 A1 | 3/2016 | Evans et al. | |
| 2017/0370348 A1 | 12/2017 | Wilson et al. | |

OTHER PUBLICATIONS

Barthelmie, J.R., "Meteorological Controls on Wind Turbine Wakes," Proceedings of the IEEE, vol. 101, No. 4, pp. 1010-1019 (Apr. 2013).

Beyer, G.H., et al., "Wake Effects in a Linear Wind Farm," Journal of Wind Engineering and Industrial Aerodynamics, vol. 51, Issue 3, pp. 303-318 (May 1994).

Park, J., and Law, H.K., "A data-driven, cooperative wind farm control to maximize the total power production," Applied Energy, vol. 165, Issue 1, pp. 151-165 (Mar. 2016).

Extended European Search Report and Opinion issued in connection with corresponding EP Application No. 17172443.8 dated Nov. 9, 2017.

\* cited by examiner

SYSTEM AND METHOD FOR DETERMINING WIND FARM WAKE LOSS

FIELD OF THE INVENTION

The present invention relates generally to wind farms, and more particularly, to systems and methods for estimating wind farm wake loss via measurement.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having one or more rotor blades. The rotor blades transform wind energy into a mechanical rotational torque that drives one or more generators via the rotor. The generators are sometimes, but not always, rotationally coupled to the rotor through the gearbox. The gearbox steps up the inherently low rotational speed of the rotor for the generator to efficiently convert the rotational mechanical energy to electrical energy, which is fed into a utility grid via at least one electrical connection. Such configurations may also include power converters that are used to convert a frequency of generated electric power to a frequency substantially similar to a utility grid frequency.

A plurality of wind turbines are commonly used in conjunction with one another to generate electricity and are commonly referred to as a "wind farm." Wind turbines on a wind farm typically include their own meteorological monitors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm is commonly provided. The correlation of meteorological data with power output allows the empirical determination of a "power curve" for the individual wind turbines.

Traditionally, wind farms are controlled in a decentralized fashion to generate power such that each turbine is operated to maximize local energy output and to minimize impacts of local fatigue and extreme loads. To this end, each turbine includes a control module, which attempts to maximize power output of the turbine in the face of varying wind and grid conditions, while satisfying constraints like sub-system ratings and component loads. Based on the determined maximum power output, the control module controls the operation of various turbine components, such as the generator/power converter, the pitch system, the brakes, and the yaw mechanism to reach the maximum power efficiency.

However, in practice, such independent optimization of the wind turbines ignores farm-level performance goals, thereby leading to sub-optimal performance at the wind farm level. For example, downwind turbines may experience large wake effects caused by one or more upwind or upstream turbines. Because of such wake effects, downwind turbines receive wind at a lower speed, drastically affecting their power output (as power output increases with wind speed). Consequently, maximum efficiency of a few wind turbines may lead to sub-optimal power output, performance, or longevity of other wind turbines in the wind farm.

Energy capture losses in wind farms can range from about 5% up to about 15% or higher on an annual basis and should be accounted for in project planning and/or financing. However, accurate quantification of wind farm production losses caused by reduced wind speeds and/or altered flow structure in the interior of the wind farm as compared to the undisturbed freestream inflow at the upstream perimeter of the wind farm from recorded turbine operational data can be difficult to obtain.

In addition, there are many products, features, and/or upgrades available for wind turbines and/or wind farms configured to minimize wake effects and increase power production of the wind farm. Once an upgrade has been installed, it would advantageous to efficiently verify the benefit of the upgrade.

Thus, a system and method for quantifying wind farm wake loss so as to validate an increase in energy production of a wind farm in response to one or more upgrades being provided thereto would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for determining wake losses of a wind farm. The wind farm includes a plurality of wind turbines. The method includes operating the wind farm in a first operational mode. Another step includes collecting turbine-level data from at least one upstream wind turbines in the wind farm during the first operational mode. The method also includes estimating a freestream farm-level power output for the wind farm during first operational mode based, at least in part, on the collected turbine-level data. As used herein, the freestream farm-level power output is characterized as being wake free. As such, a further step includes measuring an actual farm-level power output for the wind farm for the first operational mode. Thus, the method also includes determining the wake losses of the wind farm for the first operational mode as a function of the measured actual farm-level power output and the estimated freestream farm-level power output.

In one embodiment, the method may also include organizing the collected turbine-level data into a plurality of time-series and averaging the turbine-level data in each of the plurality of time-series. More specifically, in certain embodiments, each of the time-series may be ten-minute intervals.

In another embodiment, the step of estimating the freestream farm-level power output for the wind farm during first operational mode may include classifying each of the wind turbines in the wind farm as a function of wind direction and/or site layout, identifying one or more upstream reference wind turbines without wake losses having at least one downstream wind turbine, determining a time-averaged reference power output for each of the upstream reference wind turbines for a particular wind direction or wind speed range, replacing power of underperforming downstream wind turbines with the reference power output, and summing the power output from each of the wind turbines in the wind farm.

In further embodiments, the step of identifying one or more upstream reference wind turbines without wake losses may include at least one of identifying at least one wind turbine with maximum power production or identifying at least one wind turbine with median power production. In another embodiment, the step of determining the reference power output for each of the upstream reference wind turbines may include estimating incoming wind speed of the wind farm and determining the reference power output based, at least in part, on the estimated incoming wind speed.

In another embodiment, the turbine-level data may include at least one of or a combination of the following: nacelle position, power output, torque output, pitch angle, tip speed ratio, yaw angle, thrust, generator speed, operational states, curtailment states, geographical information, temperature, pressure, wind turbine location, wind farm location, weather conditions, wind gusts, wind speed, wind direction, wind acceleration, wind turbulence, wind shear, wind veer, wake, or any other operational and/or wind condition of the wind farm.

In additional embodiments, the step of determining the wake losses of the wind farm as a function of the measured actual farm-level power output and the estimated freestream farm-level power output may include summing measured powers from all of the wind turbines in the wind farm, summing estimated freestream powers from all of the wind turbines in the wind farm, determining a ratio of the sum of the measured powers and the sum of the estimated freestream powers, and subtracting the ratio from one.

In further embodiments, the method may include excluding certain turbine-level data based on one or more exclusion criteria. More specifically, in certain embodiments, the exclusion criteria may include at least one of the following conditions: wind turbines without full or partial load, wind turbines with curtailment, wind turbines in automatic control optimization mode, and/or wind turbines with non-nominal behavior active.

In yet another embodiment, the method may further include verifying whether a nacelle position correction is needed for each of the wind turbines in the wind farm, providing the nacelle position correction for each of the wind turbines in the wind farm, determining a nacelle direction for each of the wind turbines in the wind farm in normal power production, setting a farm-level wind direction to a median or average of the nacelle directions for one or more of the wind turbines or a subset of wind turbines in the wind farm, and setting a farm-level wind speed to a median or average wind speed for one or more freestream wind turbines or a subset of freestream wind turbines in the wind farm.

In still a further embodiment, the method may also include operating the wind farm in a second operational mode. Further, the second operational mode is characterized by at least one of one or more of the wind turbines being provided with an upgrade or a different time period than the first operational period. Thus, the method further includes collecting turbine-level data from at least one upstream wind turbines in the wind farm during the second operational mode, estimating a freestream farm-level power output for the second operational mode based, at least in part, on the collected turbine-level data, measuring an actual farm-level power output for the second operational mode, and determining the wake losses of the wind farm for the second operational mode as a function of the measured actual farm-level power output and the estimated freestream farm-level power output.

In certain embodiments, the step of estimating the freestream farm-level power output for the second operational mode may include classifying each of the wind turbines in the wind farm as a function of wind direction and site layout, identifying one or more upstream reference wind turbines without wake losses having at least one downstream wind turbine and taking into account non-nominal operation of the second operational mode, determining a time-averaged reference power output for each of the upstream reference wind turbines for a particular wind direction or wind speed range, replacing power of underperforming downstream wind turbines with the reference power output, and summing the power output from each of the wind turbines in the wind farm.

In another embodiment, the method may further include toggling between the first and second operational modes and collecting turbine-level data during each of the modes. Alternatively, the method may include operating the wind turbine in the first and second operational modes in a sequential manner, i.e. one after the other.

In additional embodiments, the upgrade(s) as described herein may include any one of or a combination of the following: a revised pitch or yaw angle, tip speed ratio, rotor blade chord extensions, software upgrades, controls upgrades, hardware upgrades, wake controls or wake improvements, aerodynamic upgrades, blade tip extensions, vortex generators, or winglets.

In another aspect, the present disclosure is directed to a system for estimating wake losses of a wind farm. The wind farm includes a plurality of wind turbines. The system includes a processor configured to perform one or more operations, including but not limited to operating the wind farm in a first operational mode, receiving turbine-level data from at least one upstream wind turbines in the wind farm during the first operational mode, estimating a freestream farm-level power output for the wind farm during first operational mode based, at least in part, on the collected turbine-level data, measuring an actual farm-level power output for the wind farm for the first operational mode, and determining the wake losses of the wind farm for the first operational mode as a function of the measured actual farm-level power output and the estimated freestream farm-level power output.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for determining or quantifying wake losses of a wind farm having a plurality of wind turbines from wind farm data that can be compared to model predictions. More specifically, the method includes operating the wind farm in at least a first operational mode. Another step includes collecting turbine-level data from at least one upstream wind turbines in the wind farm during the first operational mode. The method also includes estimating a freestream or wake free power output for the first operational mode based, at least in part, on the collected turbine-level data. Further, the method includes measuring an actual farm-level power output for the wind farm for the first operational mode. Thus, the method includes determining the wake losses of the wind farm for the first operational mode as a function of the measured actual farm-level power output and the estimated freestream farm-level power output.

As used herein, a "freestream" wind turbine generally refers to a wind turbine having no other wind turbines upstream thereof with respect to an incoming wind direction. Further, as used herein, a "reference" wind turbine generally refers to a freestream wind turbine having with one or more wind turbines downstream thereof with respect to the incoming wind direction. A reference turbine may also include a freestream wind turbine without any downstream wind turbines with respect to the incoming wind direction.

The various embodiments of the system and method of the present disclosure provide numerous advantages not present in the prior art. For example, the present disclosure provides an accurate system and method for determining or quantifying wake losses of a wind farm that can be used for preconstruction estimation of expected wind farm production, site planning, and/or financing. Further, the present disclosure can transform the large amount of historical wind farm production data in the wind farm database into accurate training data to improve/validate wake loss models. As such, reducing the uncertainty of energy capture predictions directly impacts financing cost due to reduced risk. In addition, the present disclosure accurately quantifies the benefit quantification of various wind farm upgrades or the impact that other control, software, or hardware changes, and/or seasonal or other climatological differences may have on the overall wake loss of the wind farm. Further, the system of the present disclosure relies on the turbine data channels typically logged by the SCADA (Supervisory Control and Data Acquisition) system and does not require additional measurements using remote sensors and/or wind speed measurements on a meteorological tower, though these complimentary data sources may be integrated into the analysis.

Figure 1:
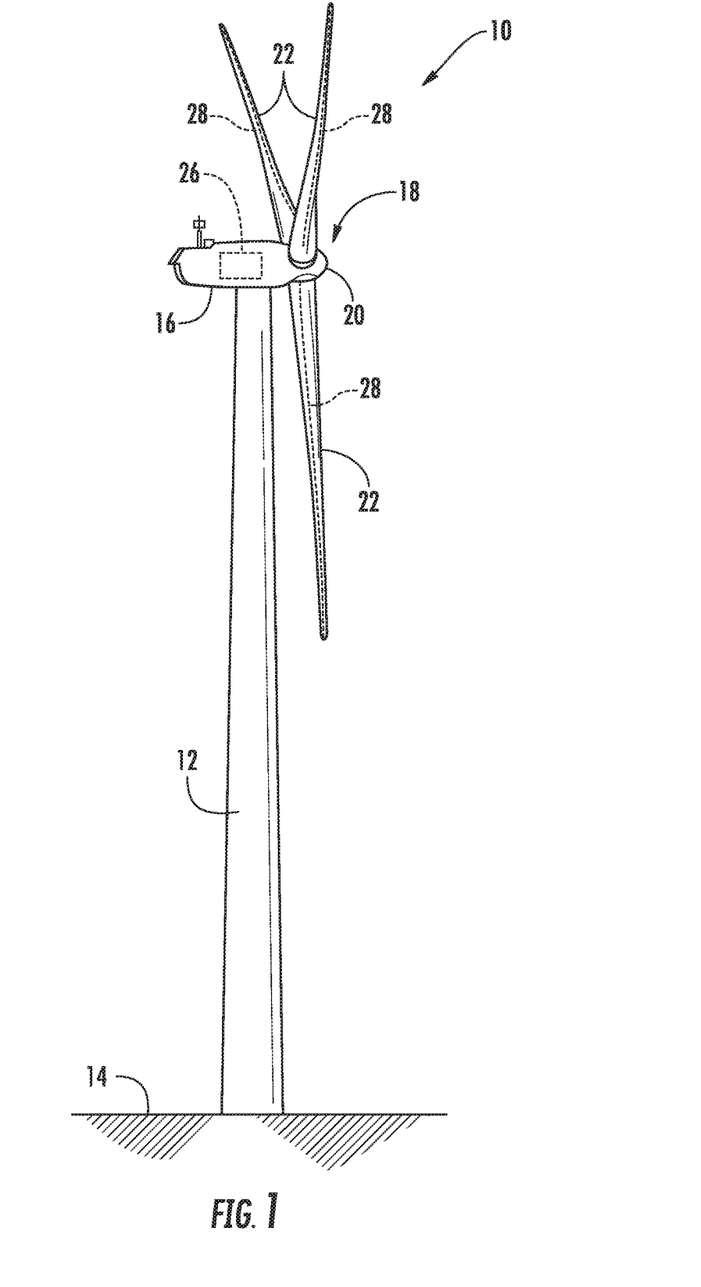
FIG. 1 illustrates a perspective view of one embodiment of a wind turbine.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Figure 2:
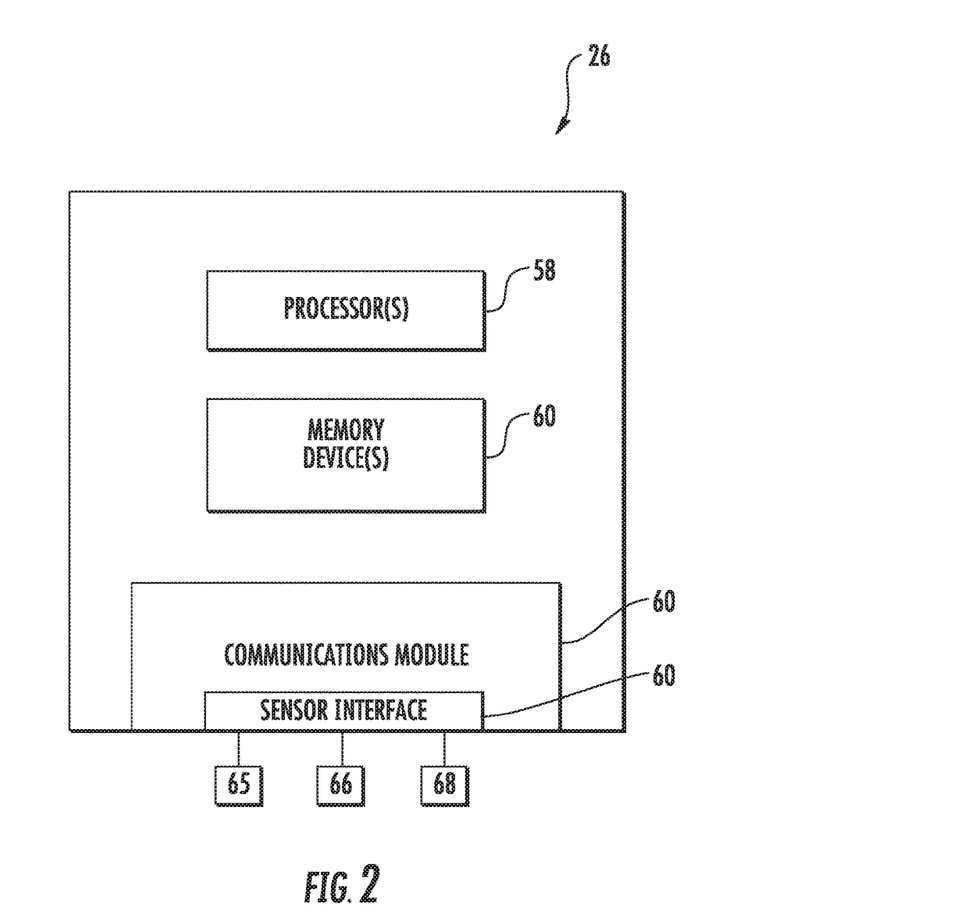
FIG. 2 illustrates a schematic view of one embodiment of a controller for use with the wind turbine shown in FIG. 1.

Referring now to FIG. 2, a block diagram of one embodiment of suitable components that may be included within the controller 26 is illustrated in accordance with aspects of the present disclosure. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 60 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 68 to be converted into signals that can be understood and processed by the controller 26. Furthermore, it should be appreciated that the sensors 65, 66, 68 may be communicatively coupled to the communications module 62 using any suitable means. For example, as shown in FIG. 2, the sensors 65, 66, 68 are coupled to the sensor interface 64 via a wired connection. However, in alternative embodiments, the sensors 65, 66, 68 may be coupled to the sensor interface 64 via a wireless connection, such as by using any suitable wireless communications protocol known in the art. For example, the communications module 62 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 58 may be configured to receive one or more signals from the sensors 65, 66, 68.

The sensors 65, 66, 68 may be any suitable sensors configured to measure any operational data of the wind turbine 10 and/or wind parameters of the wind farm 200. For example, the sensors 65, 66, 68 may include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters (e.g. wind speed, wind direction, etc.). Further, the sensors 65, 66, 68 may be located near the ground of the wind turbine 10, on the nacelle 16, on a meteorological mast of the wind turbine 10, or any other location in the wind farm.

It should also be understood that any other number or type of sensors may be employed and at any location. For example, the sensors may be accelerometers, pressure sensors, strain gauges, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors 65, 66, 68 may, for example, be used to generate signals relating to the parameter being monitored, which can then be utilized by the controller 26 to determine the actual condition.

Figure 3:
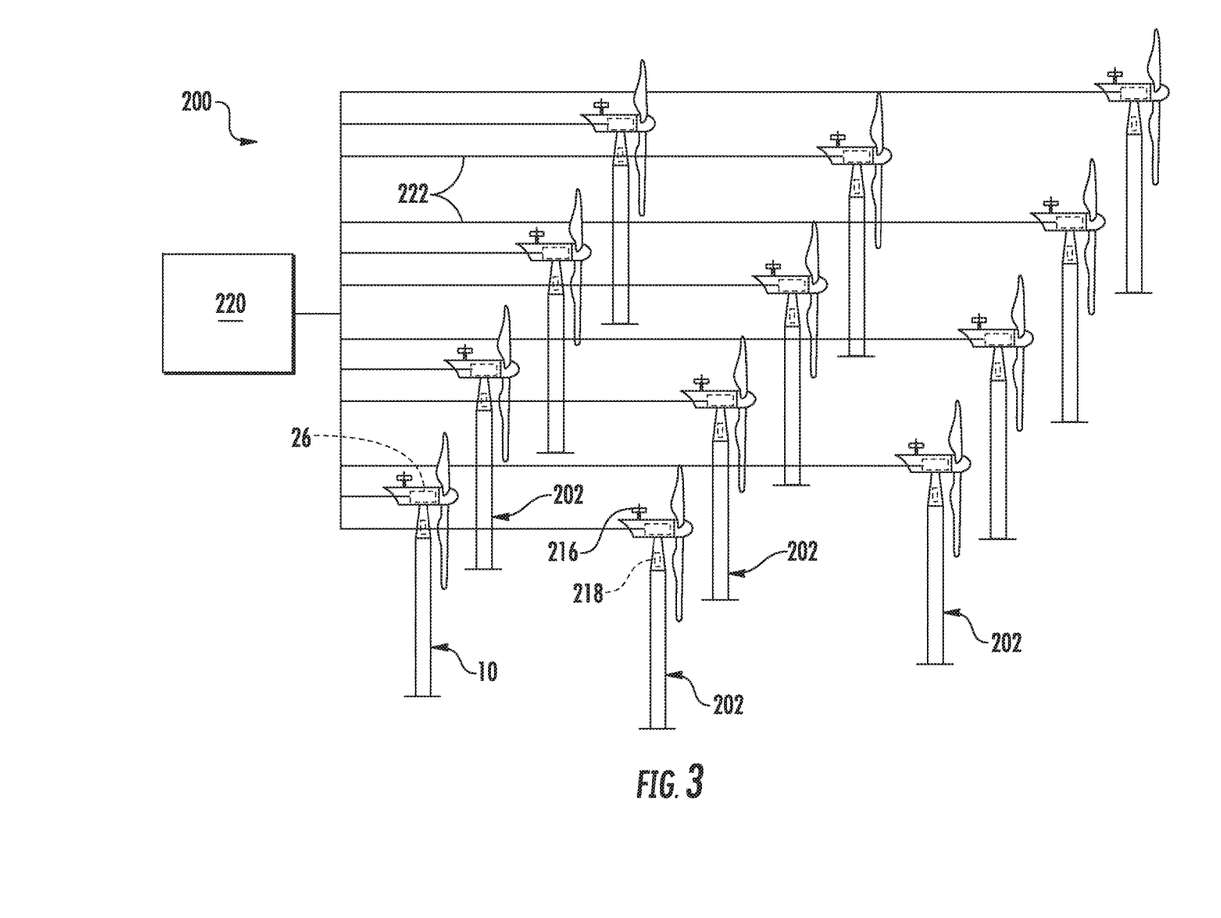
FIG. 3 illustrates a schematic view of one embodiment of a wind farm according to the present disclosure.

Referring now to FIG. 3, a wind farm 200 that is controlled according to the system and method of the present disclosure is illustrated. As shown, the wind farm 200 may include a plurality of wind turbines 202, including the wind turbine 10 described above, and a farm controller 220. For example, as shown in the illustrated embodiment, the wind farm 200 includes twelve wind turbines, including wind turbine 10. However, in other embodiments, the wind farm 200 may include any other number of wind turbines, such as less than twelve wind turbines or greater than twelve wind turbines. In one embodiment, the controller 26 of the wind turbine 10 may be communicatively coupled to the farm controller 220 through a wired connection, such as by connecting the controller 26 through suitable communicative links 222 (e.g., a suitable cable). Alternatively, the controller 26 may be communicatively coupled to the farm controller 220 through a wireless connection, such as by using any suitable wireless communications protocol known in the art. In addition, the farm controller 220 may be generally configured similar to the controllers 26 for each of the individual wind turbines 202 within the wind farm 200.

In several embodiments, one or more of the wind turbines 202 in the wind farm 200 may include a plurality of sensors for monitoring various operational data of the individual wind turbines 202 and/or one or more wind parameters of the wind farm 200. For example, as shown, each of the wind turbines 202 includes a wind sensor 216, such as an anemometer or any other suitable device, configured for measuring wind speeds or any other wind parameter. For example, in one embodiment, the wind parameters include information regarding at least one of or a combination of the following: a wind gust, a wind speed, a wind direction, a wind acceleration, a wind turbulence, a wind shear, a wind veer, a wake, SCADA information, or similar.

As is generally understood, wind speeds may vary significantly across a wind farm 200. Thus, the wind sensor(s) 216 may allow for the local wind speed at each wind turbine 202 to be monitored. In addition, the wind turbine 202 may also include one or more additional sensors 218. For instance, the sensors 218 may be configured to monitor electrical properties of the output of the generator of each wind turbine 202, such as current sensors, voltage sensors, temperature sensors, or power sensors that monitor power output directly based on current and voltage measurements. Alternatively, the sensors 218 may include any other sensors that may be utilized to monitor the power output of a wind turbine 202. It should also be understood that the wind turbines 202 in the wind farm 200 may include any other suitable sensor known in the art for measuring and/or monitoring wind parameters and/or wind turbine operational data.

Figure 4:
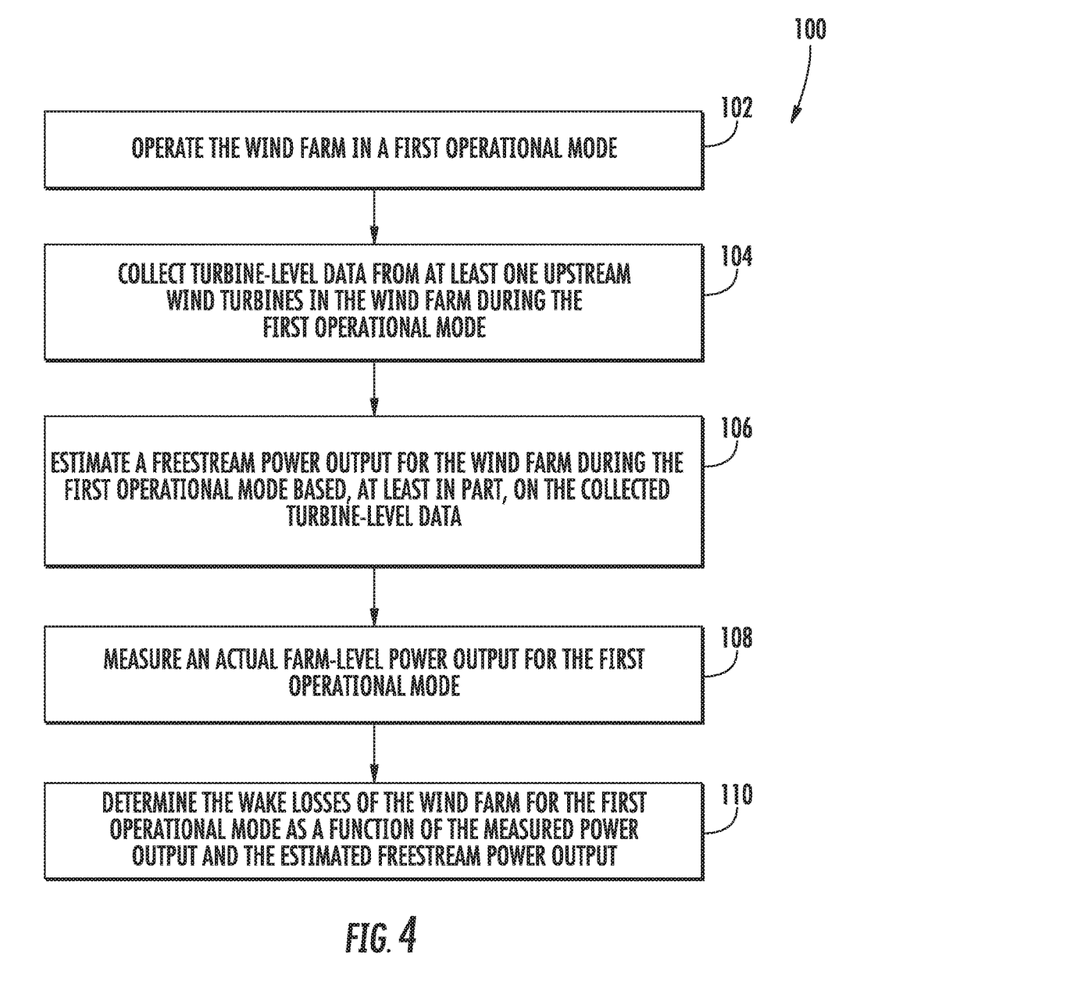
FIG. 4 illustrates a flow diagram of one embodiment of a method for determining wake losses of a wind farm having a plurality of wind turbines according to the present disclosure.

Referring now to FIG. 4, a flow diagram of one embodiment of a method 100 for estimating wake losses of a wind farm 200 is illustrated. For example, in one embodiment, the farm controller 220 or the individual wind turbine controllers 26 may be configured to perform any of the steps of the method 100 as described herein. Further, in additional embodiments, the method 100 of the present disclosure may be performed manually via a separate computer not associated with the wind farm 200. As independent optimization of the wind turbines 202 may further actually decrease overall energy production of the wind farm 200, it is desirable to configure operation of the wind turbines 202 such that the farm-level energy output is increased.

Thus, as shown at 102, the method 100 includes operating the wind farm 200 in a first operational mode. As shown at 104, the method 100 includes collecting turbine-level data from at least one upstream wind turbines 202 in the wind farm 200 during the first operational mode. For example, in certain embodiments, the wind farm 200 may be operated in the first operational mode for days, weeks, months, or longer and the data may be stored. Thus, in certain embodiments, the controllers 26, 220 (or a separate computer) may be configured to collect operational data from each of the wind turbines 202 in the wind farm 200 during the first operational mode. More specifically, in certain embodiments, the data may be part of the SCADA system for remote monitoring and control of the wind farm 200 that operates with coded signals over communication channels. In one embodiment, the wind parameters and/or the operational data may be generated via one or more of the sensors (e.g. via sensors 65, 66, 68, 216, 218, or any other suitable sensor). In addition, the wind parameters and/or the operational data may be determined via a computer model within the one of the controllers 26, 220 to reflect the real-time conditions of the wind farm 200.

Thus, the turbine-level data is collected during each of the operational modes for further analysis. Further, the turbine-level data as described herein may include information regarding at least one of or a combination of the following: nacelle position, power output, torque output, pitch angle, tip speed ratio, yaw angle, thrust, generator speed, operational states, curtailment states, geographical information, temperature, pressure, wind turbine location, wind farm location, weather conditions, wind gusts, wind speed, wind direction, wind acceleration, wind turbulence, wind shear, wind veer, wake, or any other operational and/or wind conditions of the wind farm 200.

In additional embodiments, the controllers 26, 220 (or a separate computer) may be configured to filter, average, sum, and/or adjust the turbine-level data. In one embodiment, for example, the method 100 may include organizing the collected turbine-level data into a plurality of time-series and averaging the turbine-level data in each of the time-series. More specifically, in certain embodiments, each of the time-series may be ten-minute intervals. In further embodiments, the data may be organized into any suitable time intervals including less than ten minutes and more than ten minutes.

In addition, in certain embodiments, data quality algorithms stored in the controllers 26, 220 (or a separate computer) may be configured so as to filter one or more outliers, account for missing data points, and/or complete any other suitable processing steps. More specifically, the controllers 26, 220 may have a data filtering algorithm stored therein that iterates through each data point and flags various data points based on certain selection criteria. For example, in certain embodiments, the selection criteria for a particular time period may include a turbine identification number, date/time, average power, average wind speed, operational state, noise, grid coupling, turbine faults, turbine stops, and/or any other suitable selection criteria.

In further embodiments, the controllers 26, 220 (or a separate computer) may be configured to exclude certain collected turbine-level data of the wind turbines 202 based on one or more exclusion criteria. More specifically, in certain embodiments, the exclusion criteria may include at least one of the following conditions: wind turbines without full or partial load, wind turbines with curtailment, atypical events such as icing, wind turbines in automatic control optimization mode, or wind turbines with non-nominal behavior active. In other words, if any one turbine 202 meets one or more of the exclusion criteria at a given time, the timestamp is thrown out for that turbine 202. In another embodiment, the controllers 26, 220 may require a certain threshold (e.g. greater than 95%) of wind turbines 202 to be operating in a valid operating state (i.e. uncurtailed) before estimating the wind farm wake losses.

Figure 5:
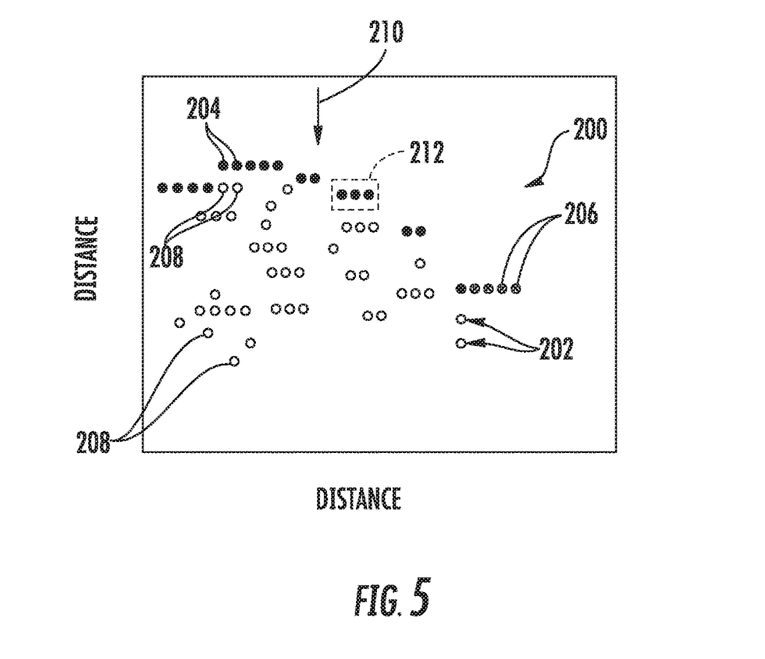
FIG. 5 illustrates a schematic diagram of one embodiment of a site layout of the wind farm according to the present disclosure.

Referring still to FIG. 4, as shown at 106, the method 100 also includes estimating a freestream farm-level power output for the wind farm during first operational mode based, at least in part, on the collected turbine-level data. As mentioned, the freestream farm-level power output is characterized as being wake free or representative of a wind farm having no wake effects. Further, in one embodiment, the step of estimating the freestream farm-level power output for the wind farm during first operational mode may include classifying each of the wind turbines 202 in the wind farm 200 as a function of wind direction and site layout. More specifically, as shown in FIG. 5, a schematic diagram of one embodiment of a layout of the wind farm 200 is illustrated. Thus, as shown in the illustrated embodiment, the wind turbines 202 may be classified as freestream wind turbines 204 having at least one downstream turbine 208 with respect to the wind direction 210, freestream wind turbines 206 without downstream turbines 208 with respect to the wind direction 210, and/or downstream wind turbines 208 with respect to the wind direction 210. Further, the controllers 26, 220 (or a separate computer) may be configured to identify one or more upstream reference wind turbines 212 without wake losses having at least one downstream wind turbine that can be used to estimate the freestream farm-level power output for the wind farm during first operational mode. In other words, the upstream reference wind turbine(s) 212 may be chosen from the group of freestream wind turbines 204 having at least one downstream turbine 208 with respect to the wind direction 210.

In addition, the method 100 may include estimating the freestream farm-level power output for the wind farm during first operational mode by determining a time-averaged reference power output for each of the upstream reference wind turbines 212 for the wind direction (and/or wind speed range). Further, the reference power output of the reference turbine(s) may be directly measured or estimated via the controllers 26, 220. Thus, the method 100 may also include replacing power of downstream wind turbines 208 with the reference power output. More specifically, in a preferred embodiment, the method 100 only replaces the power of underperforming downstream wind turbines 208, relative to the freestream reference power. In addition, the method 100 includes summing the power output from each of the wind turbines in the wind farm 200.

More specifically, in particular embodiments, the method 100 may include binning observed wind conditions into wind direction sectors (e.g. with centers at 0°, 10°, . . . 350° and a bin width of 10°). For each wind direction bin, the method 100 may include identifying a set of potential reference turbines and determining an average power for each turbine in the identified wind direction sector. The reference turbines(s) 212 may be chosen using a variety of methods, including for example identifying one or more upstream wind turbines 204 having the maximum or highest power production or identifying one or more upstream wind turbines 204 with a median power production. In addition, the method 100 may include identifying a set of potentially wake-affected wind turbines and determining an average power of each individual turbine over the entire data captured in this wind direction sector. Such wake-affected turbines may be identified by determining whether such turbines perform worse than either the best performing reference turbine or the reference turbine with the median performance. It should be understood that the identification of the reference turbine(s) 212 and the selection of downstream turbines 208 flagged for replacement can occur either in bulk on the time-aggregated dataset or separately at each time interval. For example, in one embodiment, the reference power output $P_{t\text{-}wakefree}$ for a time interval t may be calculated using Equation (1) below:

$$P_t^{wakefree} = \Sigma_{i=1}^{nfree} P_{i,t}^{free} + \Sigma_{i=1}^{ndown} P_{i,t}^{down} + n_{waked} * P_t^{ref} \quad \text{Equation (1)}$$

Where $P_{t\text{-}ref}$ is the power output for the reference turbine(s),
$P_{i,t\_free}$ is the power output of the freestream wind turbine(s),
$P_{i,t\_down}$ is the power output of the downstream turbine(s),
$n_{waked}$ is the number of wake-affected wind turbines,
$n_{free}$ is the number of free stream wind turbines for time interval t, and
$n_{down}$ is the number of downstream wind turbines for time interval t.

In further embodiments, the step of determining the time-averaged reference power output for each of the upstream reference wind turbines 212 may include estimating the incoming wind speed of the wind farm 200 and determining the reference power output based, at least in part, on the estimated incoming wind speed.

Referring back to FIG. 4, as shown at 108, the method 100 also includes measuring an actual farm-level power output for the wind farm for the first operational mode. For example, in certain embodiments, the actual farm-level power output may be measured via sensors and/or estimated via the controller(s) 26, 220 (or separate computer). Further, as shown at 110, the method 100 includes determining the wake losses of the wind farm 200 for the first operational mode as a function of the measured actual farm-level power output and the estimated freestream farm-level power output. More specifically, in one embodiment, the step of determining the wake losses of the wind farm 200 as a function of the measured actual farm-level power output and the estimated freestream farm-level power output may include summing measured powers from all of the wind turbines 202 in the wind farm 200, summing estimated freestream powers from all of the wind turbines 202 in the wind farm 200, determining a ratio of the sum of the measured powers and the sum of the estimated freestream powers, and subtracting the ratio from one. For example, in certain embodiments, the wake losses L may be calculated using Equation (2) below:

$$L = 1 - \Sigma_{t=1}^{n} P_t^{meas} / \Sigma_{t=1}^{n} P_t^{wakefree} \quad \text{Equation (2)}$$

Where $P_{t\text{-}meas}$ is the measured power of all wind turbines 202 in the wind farm 202 in normal power production for a time interval t, and
$P_{t\text{-}wakefree}$ is the estimated total freestream farm-level power output for of all wind turbines 202 in the wind farm 202 in normal power production for time interval t.

Figure 6:
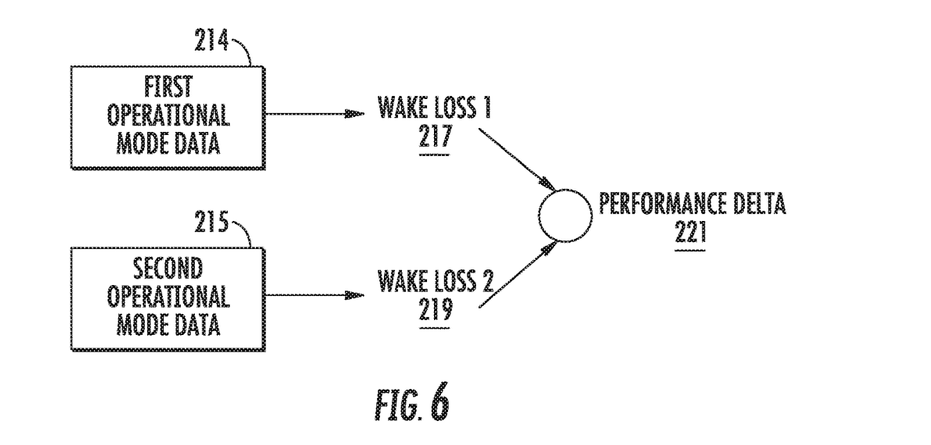
FIG. 6 illustrates a schematic diagram of one embodiment of determining the wake loss of the wind farm for multiple operating modes according to the present disclosure.

Referring now to FIG. 6, a schematic diagram of one embodiment of estimating wake loss of the wind farm 200 by operating the wind farm 200 in multiple operating modes is illustrated. By operating the wind farm in different modes, a benefit of an upgrade, e.g. a wake management upgrade, can be realized. Thus, as shown, the method 100 may also include operating the wind farm 200 in first and second operational modes. More specifically, in certain embodiments, at least one of the modes, e.g. the second operational mode, may be characterized by one or more of the wind turbines 202 being provided with an upgrade. Such upgrades, for example, may include a wake improvement upgrade. In addition, the upgrade(s) any one of or a combination of the following: a revised pitch or yaw angle, tip speed ratio, rotor blade chord extensions, software upgrades, controls upgrades, hardware upgrades, wake controls, aerodynamic upgrades, blade tip extensions, vortex generators, winglets, or any other modification. Alternatively, the first and second operational modes may simply be distinguished by different periods of time.

Thus, the method 100 may include collecting turbine-level data from two or more upstream wind turbines 202 in the wind farm 200 during the first and second operational modes 214, 215 and estimating a freestream farm-level power output for the first and second operational modes based, at least in part, on the collected turbine-level data. It should be understood that the estimated freestream farm-level power output for each mode may be estimated using any suitable methods as described herein. Further, the method 100 may include measuring the actual farm-level power output for the first and second operational modes and determining the wake losses (e.g. 217, 219) for the wind farm 200 for each of the modes as a function of the measured actual farm-level power output and the estimated freestream farm-level power output. As such, the method 100 may further include determining a difference or a performance delta 221 between the wake losses 217, 219 of the first and second operational modes such that a benefit of the upgrade(s) may be realized.

Similar to the first operational mode, the controllers 26, 220 (or a separate computer) may estimate the freestream farm-level power output for the second operational mode by classifying each of the wind turbines 202 in the wind farm 200 as a function of wind direction and/or site layout, identifying one or more upstream reference wind turbines 212 without wake losses having at least one downstream wind turbine and taking into account non-nominal operation of the second operational mode, determining a time-averaged reference power output for each of the upstream reference wind turbines for a particular wind direction or wind speed range, replacing power of underperforming downstream wind turbines with the reference power output, and summing the power output from each of the wind turbines 202 in the wind farm 200.

In another embodiment, the method 100 may further include toggling between the first and second operational modes and collecting turbine-level data during each of the modes. Alternatively, the controllers 26, 220 (or a separate computer) may include operating the wind farm 200 in the first and second operational modes in a sequential manner, i.e. before/after modifying the wind turbines 202 in the wind farm 200.

In yet another embodiment, the method 100 may further include verifying the nacelle position data for each of the wind turbines 202 in the wind farm 200 and correcting the signal if required in order to use the signal to determine a nacelle direction for each of the wind turbines 202 in the wind farm 200. A reference farm-level wind direction may be set by the median of the nacelle directions from all wind turbines 202 or any other suitable methods. Further, a reference farm-level inflow wind speed may be set based on the nacelle wind speed median of the reference turbines 212 or any other suitable means.

Exemplary embodiments of a wind farm, a controller for a wind farm, and a method for controlling a wind farm are described above in detail. The method, wind farm, and controller are not limited to the specific embodiments described herein, but rather, components of the wind turbines and/or the controller and/or steps of the method may be utilized independently and separately from other components and/or steps described herein. For example, the controller and method may also be used in combination with other power systems and methods, and are not limited to practice with only the wind turbine controller as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind farm, the wind farm having a plurality of wind turbines, the method comprising:
    operating the wind farm in a first operational mode via a controller;
    classifying each of the wind turbines in the wind farm as a function of wind direction and site layout;
    collecting, via the controller, turbine-level data from at least one upstream reference wind turbine in the wind farm without wake losses having at least one downstream wind turbine during the first operational mode;
    determining a time-averaged reference power output for the at least one upstream reference wind turbine for a particular wind direction or wind speed range;
    replacing power of the at least one downstream wind turbine with the time-averaged reference power output;
    estimating, via the controller, a freestream farm-level power output for the wind farm during first operational mode by summing the time-averaged reference power output for the at least one upstream reference wind turbine and the replaced power of the at least one downstream wind turbine;
    measuring an actual farm-level power output for the wind farm for the first operational mode;
    determining, via the controller, wake losses of the wind farm for the first operational mode as a function of the measured actual farm-level power output for the first operational mode and the estimated freestream farm-level power output during the first operational mode;
    operating the wind farm in a second operational mode via the controller, the second operational mode being characterized by one or more of the wind turbines being provided with an upgrade;
    collecting, via the controller, turbine-level data from at least one upstream wind turbine in the wind farm during the second operational mode;
    estimating, via the controller, a freestream farm-level power output for the wind farm during the second operational mode based, at least in part, on the turbine-level data collected during the second operational mode;
    measuring an actual farm-level power output for the second operational mode;
    determining, via the controller, wake losses of the wind farm for the second operational mode as a function of the measured actual farm-level power output for the second operational mode and the estimated freestream farm-level power output during the second operational mode;
    toggling between the first and second operational modes;
    selecting to operate the wind farm in the first operational mode or the second operational mode based the determined wake losses of the wind farm for the first and second operational modes; and
    operating the wind farm in the selected operational mode so as to minimize future wake losses, wherein operating the wind farm in the selected operational mode comprises at least one of controlling a pitch angle, a yaw angle, a generator speed, or a power set point.

2. The method of claim 1, further comprising organizing the collected turbine-level data into a plurality of time-series of the wind direction and averaging the turbine-level data in each of the plurality of time-series of the wind direction.

3. The method of claim 1, wherein replacing the power of one or more downstream wind turbines with the reference power output further comprises replacing power of under-performing downstream wind turbines with the reference power output.

4. The method of claim 1, wherein identifying the one or more upstream reference wind turbines without wake losses further comprises at least one of identifying at least one wind turbine with a maximum power production, identifying at least one wind turbine with a median power production, or identifying at least one wind turbine with an average power production of all reference wind turbines.

5. The method of claim 1, wherein determining the reference power output for each of the upstream reference wind turbines further comprises estimating incoming wind speed of the wind farm and determining the reference power output based, at least in part, on the estimated incoming wind speed.

6. The method of claim 1, wherein the turbine-level data comprises at least one of or a combination of the following: nacelle position, power output, torque output, pitch angle, tip speed ratio, yaw angle, thrust, operating state, curtailment state, generator speed, geographical information, temperature, pressure, wind turbine location, wind farm location, weather conditions, wind gusts, wind speed, wind direction, wind acceleration, wind turbulence, wind shear, wind veer, or wake.

7. The method of claim 1, wherein determining the wake losses of the wind farm as a function of the measured actual farm-level power output and the estimated freestream farm-level power output further comprises:
    summing measured powers from all of the wind turbines in the wind farm,
    summing estimated freestream powers from all of the wind turbines in the wind farm,
    determining a ratio of the sum of the measured powers and the sum of the estimated freestream powers, and
    subtracting the ratio from one.

8. The method of claim 1, further comprising excluding certain turbine-level data of wind turbines based on one or more exclusion criteria, wherein the exclusion criteria comprises at least one of the following conditions: wind turbines without full or partial load, wind turbines with curtailment, wind turbines experiencing atypical events, wind turbines in automatic control optimization mode, or wind turbines with non-nominal behavior active.

9. The method of claim 1, further comprising:
verifying whether a nacelle position correction is needed for each of the wind turbines in the wind farm,
providing the nacelle position correction for each of the wind turbines in the wind farm if needed,
determining a nacelle direction for each of the wind turbines in the wind farm in normal power production,
setting a farm-level wind direction to a median or average of the nacelle directions for one or more of the wind turbines or a subset of wind turbines in the wind farm, and
setting a farm-level wind speed to a median or average wind speed for one or more freestream wind turbines or a subset of freestream wind turbines in the wind farm.

10. The method of claim 1, wherein estimating the freestream farm-level power output for the second operational mode further comprises:
classifying each of the wind turbines in the wind farm as a function of wind direction and site layout,
identifying one or more upstream reference wind turbines without wake losses having at least one downstream wind turbine and taking into account non-nominal operation of the second operational mode,
determining a time-averaged reference power output for each of the upstream reference wind turbines for a particular wind direction or wind speed range,
replacing power of underperforming downstream wind turbines with the reference power output, and
summing the power output from each of the wind turbines in the wind farm.

11. The method of claim 1, wherein the upgrade comprises any one of or a combination of the following: a revised pitch or yaw angle, tip speed ratio, rotor blade chord extensions, software upgrades, controls upgrades, hardware upgrades, wake controls, aerodynamic upgrades, blade tip extensions, vortex generators, or winglets.

12. A system for controlling a wind farm, the wind farm having a plurality of wind turbines, the system comprising:
a processor configured to perform one or more operations, the one or more operations comprising:
operating the wind farm in a first operational mode,
classifying each of the wind turbines in the wind farm as a function of wind direction and site layout;
receiving turbine-level data from at least one upstream reference wind turbine in the wind farm without wake losses having at least one downstream wind turbine during the first operational mode,
determining a time-averaged reference power output for the at least one upstream reference wind turbine for a particular wind direction or wind speed range;
replacing power of the at least one downstream wind turbine with the time-averaged reference power output;
estimating a freestream farm-level power output for the wind farm during the first operational mode by summing the time-averaged reference power output for the at least one upstream reference wind turbine and the replaced power of the at least one downstream wind turbine;
measuring an actual farm-level power output for the wind farm for the first operational mode, and
determining the wake losses of the wind farm for the first operational mode as a function of the measured actual farm-level power output and the estimated freestream farm-level power output; and
operating the wind farm in a second operational mode, the second operational mode being characterized by one or more of the wind turbines being provided with an upgrade;
collecting turbine-level data from at least one upstream wind turbine in the wind farm during the second operational mode;
estimating a freestream farm-level power output for the wind farm during the second operational mode based, at least in part, on the turbine-level data collected during the second operational mode;
measuring an actual farm-level power output for the second operational mode;
determining wake losses of the wind farm for the second operational mode as a function of the measured actual farm-level power output for the second operational mode and the estimated freestream farm-level power output during the second operational mode;
toggling between the first and second operational modes;
selecting to operate the wind farm in the first operational mode or the second operational mode based the determined wake losses of the wind farm for the first and second operational modes; and
operating the wind farm in the selected operational mode so as to minimize future wake losses, wherein operating the wind farm in the selected operational mode comprises at least one of controlling a pitch angle, a yaw angle, a generator speed, or a power set point.

13. The system of claim 12, wherein the one or more operations further comprise:
organizing the collected turbine-level data into a plurality of time-series, and
averaging the turbine-level data in each of the plurality of time-series.

14. The system of claim 12, wherein determining the wake losses of the wind farm as a function of the measured actual farm-level power output and the estimated freestream farm-level power output further comprises:
summing measured powers from all of the wind turbines in the wind farm,
summing estimated freestream powers from all of the wind turbines in the wind farm,
determining a ratio of the sum of the measured powers and the sum of the estimated freestream powers, and
subtracting the ratio from one.

15. The system of claim 12, wherein the one or more operations further comprise:
verifying whether a nacelle position correction is needed for each of the wind turbines in the wind farm,
providing the nacelle position correction for each of the wind turbines in the wind farm if needed,
determining a nacelle direction for each of the wind turbines in the wind farm in normal power production,
setting a farm-level wind direction to a median or average of the nacelle directions for one or more of the wind turbines or a subset of wind turbines in the wind farm, and
setting a farm-level wind speed to a median or average wind speed for one or more freestream wind turbines or a subset of freestream wind turbines in the wind farm.

* * * * *